US007234131B1

(12) United States Patent
Speyrer et al.

(10) Patent No.: US 7,234,131 B1
(45) Date of Patent: Jun. 19, 2007

(54) PEER REVIEW EVALUATION TOOL

(75) Inventors: Michael K. Speyrer, Greenville, TX (US); Stephen R. Davis, Greenville, TX (US); Cecilia A. Canada, Rockwall, TX (US)

(73) Assignee: Raytheon Company, Lexington, MA (US)

( * ) Notice: Subject to any disclaimer, the term of this patent is extended or adjusted under 35 U.S.C. 154(b) by 824 days.

(21) Appl. No.: 10/081,710

(22) Filed: Feb. 20, 2002

Related U.S. Application Data

(60) Provisional application No. 60/270,148, filed on Feb. 21, 2001.

(51) Int. Cl.
*G06F 9/44* (2006.01)

(52) U.S. Cl. .................... 717/101; 717/102; 717/103; 705/8

(58) Field of Classification Search ........ 717/122–128; 707/1–10; 705/8; 379/15.01
See application file for complete search history.

(56) References Cited

U.S. PATENT DOCUMENTS

| 5,907,705 | A * | 5/1999 | Carter ........................ 717/122 |
| 6,772,160 | B2 * | 8/2004 | Cho et al. .................... 707/10 |
| 2002/0049738 | A1 * | 4/2002 | Epstein ......................... 707/1 |
| 2002/0049962 | A1 * | 4/2002 | Kelbaugh et al. ........... 717/128 |
| 2002/0156668 | A1 * | 10/2002 | Morrow et al. ................ 705/8 |
| 2003/0202638 | A1 * | 10/2003 | Eringis et al. ........... 379/15.01 |

OTHER PUBLICATIONS

Integration of Groupware with Project Management via Facilitated Work Sessions, IBM Technical Disclosure Bulletin, Mar. 1, 1996, vol. 39.*

Mangomind White Paper, Mangosoft Inc, Oct. 2000.*
List of collaborative software—Wikipedia, Wikimedia Foundation, Inc.*
Fast Guide to Collaborative Software—a definition from Whatis.com.*
Process control for error-free software: a software success story—Tackett, Buford D.; Van Doren, Buddy IEEE Software vol. 16, 1999.*
The Advanced Database Environment for Planning and Tracking; Schultz, Thomas A; Bell Labs Technical Journal vol. 3 Jul./Sep. 1998.*

(Continued)

*Primary Examiner*—Meng-Al T. An
*Assistant Examiner*—Mark P. Francis
(74) *Attorney, Agent, or Firm*—Baker Botts L.L.P.

(57) ABSTRACT

A method for peer review evaluation of a product during a development stage comprises creating an evaluation header including selection of a moderator for a peer review team. The evaluation continues by identifying team members and distributing artifacts to complete the review evaluation header. An overview of the evaluation artifacts is conducted by the author, moderator and each of the team members. Following the overview each of the team members identifies potential defects in artifacts and records the potential defects in an action request database. A peer review meeting then evaluates each of the potential defects for either acceptance of a potential defect or rejection of the potential defect. The author of the evaluation team prepares a report of accepted defects and this report is entered into the action request database. The author and/or moderator monitors the action request database as a follow-up to determine if a rework has been made to the identified accepted defects. This is a continuing effort until the accepted defects have been corrected.

22 Claims, 9 Drawing Sheets

OTHER PUBLICATIONS

Generic model for fine grained configuration management including version control and traceability; Lindsay, Peter; Liu, Yaowei; Traynor, Owen; Univ of Queensland, St. Lucia, Aust Conference title, 1997.*

Observations On a Trans-Oceanic Collaboration: Anecdotes From An HP Labs Initiative, HP Laboratories Palo Alto Apr. 17, 2002.*

* cited by examiner

FIG. 4
PRET Reports Screen

FIG. 5

Action Requests (ARs) Generated Report

```
PRET Reports - Microsoft Internet Explorer                    _ □ ×
```

All ARs Generated for PRET# 334
Generated on: 9/11/2000 at: 9:00:26 AM CST

Author:                         Moderator:                          Artifact:
   Program: PROCESS    System: PROCESS    Subsystem: PRODUCT    Work Product ID:
AIS Peer Review Process    Open Version: V1    Notes: See Known Issues on Cover Sheet

---

AR Number: 1005073  Name:           Defect #: 14    Defect Type: CL    Priority: Minor
Identifier: Page Number            Number: 17    Paragraph/Line:

On page 17 of the 'AIS Peer Review Process' document under the 'Peer Review Meeting Groundrules', the next to the last bullet should have the word defect at the end. This will make that bullet read "Do not continue to the next defect until the Recorder has completed the last defect."

---

AR Number: 1005074  Name:           Defect #: 27    Defect Type: CL    Priority: Minor
Identifier: Page Number            Number: 17-17    Paragraph/Line:

Revision History date and rev are incorrect. What about title?

---

AR Number: 1005075  Name:           Defect #: 45    Defect Type: CL    Priority: Minor
Identifier: Page Number            Number: 17    Paragraph/Line: 3

Clarify meaning of -- Inspectors open the PRET header.

---

AR Number: 1005076  Name:           Defect #: 22    Defect Type: CO    Priority: Major
Identifier: Page Number            Number: 19    Paragraph/Line:

In the 'AIS Peer Review Process' document under Step 6, the first paragraph indicates that "the Author is required to enter all rework time in PRET for each defect." Because of recent modifications to PRET, this is no longer necessary.

---

AR Number: 1005077  Name:           Defect #: 26    Defect Type: OM    Priority: Major
Identifier: Page Number            Number: 19-20    Paragraph/Line:

[ Print ]                    [ Reports Menu ]

FIG. 6

All Potential Defects Report

---

All Potential Defects for PRET# 334
Generated on: 9/8/2000 at: 4:19:55 PM CST

| Author: | Moderator: | | Artifact: Code |
|---|---|---|---|
| Program: PROCESS | System: PROCESS | Subsystem: PRODUCT | Work Product ID: |
| AIS Peer Review Process | Open Version: V1 | Notes: See Known Issues on Cover Sheet | |

---

| Name: | Defect #: 2 | Defect Type: CL | Priority: Minor |
|---|---|---|---|
| Identifier: Page Number | Number: 1 | Paragraph/Line: | |

In Inspectors paragraph, Third sentence states "This is optional depending upon the review." What is optional is not clear.

| Name: | Defect #: 15 | Defect Type: OM | Priority: Minor |
|---|---|---|---|
| Identifier: Page Number | Number: 1 | Paragraph/Line: | |

In the file 'RqmtsStageChecks.html' I notice that there is no check box for ensuring that the requirements document comply with the tailored IPD process for the product.

| Name: | Defect #: 16 | Defect Type: OM | Priority: Open Issue |
|---|---|---|---|
| Identifier: Page Number | Number: 1 | Paragraph/Line: | |

Something to ask everyone at the Peer Review: Does this Peer Review process comply with Level 3 of the CMM? In the spirit of the CMM and Six Sigma is the process definition minimum but adequate in terms of the paperwork necessary. There seems to be a lot of paperwork, check-lists, etc. We just need to ensure that our process has no "muda" and that there is true value added in this new defined proposed process.

| Name: | Defect #: 17 | Defect Type: OM | Priority: Minor |
|---|---|---|---|
| Identifier: Page Number | Number: 1 | Paragraph/Line: | |

"What are Peer Reviews" section: I think this paragraph can be written to be much stronger and convincing. We have the opportunity to use this area to convince Engineers that peer reviews are worth while and that they save time and money. I see the bulletized section right below this, but I'm afraid that we need to hit them a little harder in the opening sentence. Sort of the a) tell them what you are about to tell them, b) tell them what you are going to tell them, and c) tell them what you told them principle.

[Print]  [Reports Menu]

FIG. 7

All Meeting Defects Report

---

All Meeting Defects for PRET# 334
Generated on: 9/11/2000 at: 9:11:29 PM CST

| Author: | Moderator: | Artifact: |
|---|---|---|
| Program: PROCESS | System: PROCESS  Subsystem: PRODUCT | Work Product ID: |
| AIS Peer Review Process | Open Version: V1 | Notes: See Known Issues on Cover Sheet |

---

Name:  Defect #: 2  Defect Type: CL  Priority: Minor

Identifier: Page Number  Number: 1  Paragraph/Line:

In Inspectors paragraph, Third sentence states "This is optional depending upon the review." What is optional is not clear.

Accepted: ⊙
Rejected: ○

---

Name:  Defect #: 15  Defect Type: OM  Priority: Minor

Identifier: Page Number  Number: 1  Paragraph/Line:

In the file 'RqmtsStageChecks.html' I notice that there is no check box for ensuring that the requirements document comply with the tailored IPD process for the product.

Accepted: ⊙
Rejected: ○

---

Name:  Defect #: 16  Defect Type: OM  Priority: Open Issue

Identifier: Page Number  Number: 1  Paragraph/Line:

Something to ask everyone at the Peer Review: Does this Peer Review process comply with Level 3 of the CMM? In the spirit of the CMM and Six Sigma is the process definition minimum but adequate in terms of the paperwork necessary. There seems to be a lot of paperwork, check-lists, etc. We just need to ensure that our process has no "muda" and that there is true value added in this new defined proposed process.

Accepted: ○
Rejected: ⊙

---

Name:  Defect #: 17  Defect Type: OM  Priority: Minor

Identifier: Page Number  Number: 1  Paragraph/Line:

"What are Peer Reviews" section: I think this paragraph can be written to be much stronger and convincing. We have the opportunity to use this area to convince Engineers that peer reviews are worth while and that they save time and money. I see the bulletized section right below this, but I'm afraid that we need to hit them a little harder in the opening sentence. Sort of the a) tell them what you are about to tell them, b) tell them Accepted: ⊙
Rejected: ○

---

[ Print ]        [ Reports Menu ]

FIG. 8

All Red Line Defects Report

---

PRET Reports – Microsoft Internet Explorer

All Accepted Red Line Defects for PRET# 334
Generated on: 9/11/2000 at: 9:16:17 AM CST

| | | | |
|---|---|---|---|
| Author: | Moderator: | | Artifact: |
| Program: PROCESS | System: PROCESS | Subsystem: PRODUCT | Work Product ID: |
| AIS Peer Review Process | Open Version: V1 | Notes: See Known Issues on Cover Sheet | |

---

| Name: | Defect #: 28 | Defect Type: CS |
|---|---|---|
| Identifier: Page Number | Number: 1 | Paragraph/Line: |

In the 'Inspection Checklist: Author', some bullets end with periods while other do not. Actually, this problem manifests itself in many of the artifacts in the packet.

| Name: | Defect #: 31 | Defect Type: CS |
|---|---|---|
| Identifier: Page Number | Number: 1 | Paragraph/Line: |

In the 'Individual Inspector Defect Log' and the 'Peer Review Meeting Log', the layout should be modified to make it fit horizontally onto one page. It should also fit onto one page vertically.

| Name: | Defect #: 36 | Defect Type: CS |
|---|---|---|
| Identifier: Page Number | Number: 1 | Paragraph/Line: |

In the 'Detailed Design Stage Checks', the text 'Is the logic correct according to the following:' seems to refer to the remaining bullets below it. However, in the 'AIS Peer Review Process' that same text only refers to the five bullets below it.

| Name: | Defect #: 24 | Defect Type: |
|---|---|---|
| Identifier: Page Number | Number: 5-5 | Paragraph/Line: |

2 should be spelled out.

| Name: | Defect #: 49 | Defect Type: |
|---|---|---|
| Identifier: Page Number | Number: 6-6 | Paragraph/Line: |

Prepare the Summary Report -- All of the information in this document can be entered in PRET and is not required if PRET is used. (information can be entered, but it is not useful, or should it be completed to complete the PRET Header?)

[ Print ]   [ Reports Menu ]

FIG. 9
Summary Report

FIG. 10

PEER REVIEW EVALUATION TOOL

RELATED APPLICATION

This application claims the benefit of U.S. Provisional Application Ser. No. 60/270,148, filed Feb. 21, 2001, entitled Peer Review Evaluation Tool.

TECHNICAL FIELD OF THE INVENTION

This invention relates to a method for reviewing a development project to evaluate for potential defects, and more particularly to an integrated electronic method to evaluate for potential defects in computer software.

BACKGROUND OF THE INVENTION

It has long been recognized that to develop and manufacture a substantially defect-free product, periodic evaluations are required during a development project to evaluate for potential defects. By periodic review for potential defects during the development of a product there is an improved possibility that fewer defects will be found in the final product ready for marketing. The more sophisticated the product and the amount of time required to develop a product emphasizes the need for peer review evaluation throughout the period of product development. Although peer review applies in the development of a product of any sophistication, peer review evaluation is particularly advantageous in the development of a software product, computer hardware, and computer systems.

Heretofore, peer review evaluation was made by manually completing reports, reviewing each of the reports for potential defects, and then following up to ensure that identified defects were corrected during the period of product development. The paper report peer review evaluation is a time-consuming, costly, and is not known for high reliability.

In addition to the other shortcomings of previous manual peer review evaluations there was also a problem of follow up to ensure that the identified defects were corrected before a product reached the marketplace. The manual reports were difficult to understand the identified defect. In addition, because of the difficulty of collectively evaluating individual peer review committee reports many potential defects were identified when in fact the potential defect was not an actual defect in the product. This further added to the time consumption and cost of peer review evaluation.

Heretofore, the peer review evaluation of a product under development was strictly a paper driven process. Peer review committee members would prepare a written report of what each perceived were potential defects. A peer review meeting was convened and the moderator of the review committee would go through the individual reports on a page by page basis and inquire if any one of the committee members had a potential defect on a particular page of a report that at that time was under review. Any defects noted by the committee members that were accepted by the entire committee were manually annotated on the worksheet of each committee member, and when the review meeting was concluded, all the individual worksheets were used by the committee "author" for the necessary corrective action. The author would go through each worksheet to find all the accepted defects, and correct the report under review. Tracking accepted defects was difficult primarily because the defects only existed on the worksheets of the individual committee members. The moderator during the review meeting would have to reference each defect worksheet of the various committee members while verifying that the corrections had been made for accepted defects. Because of the difficulty, metrics collection was not a part of the paper driven process.

Thus, there is a need for an integrated electronic method for progressive review of a development project to evaluate for potential defects in a product under development prior to marketing the product.

SUMMARY OF THE INVENTION

In accordance with the present invention, there is provided an integrated electronic process for progressive review of a development project to evaluate for potential defects in a product prior to marketing thereof. The peer review evaluation process of the present invention is integrated with an action request database as a solution to problems identified in previous methods of peer review. The integrated electronic peer review evaluation process is browser based software, thus allowing access by means of area networks to anyone having a personal computer coupled to the network. This enables easy access to the review process for members of the review committee and also enables those charged with the responsibility of correcting defects to have ready access to defect reports generated by the committee during the review process.

Individual members of the group review committee enter potential defect data through the keyboard of their personal computer and this data is stored in an action request database and printed out in page order. When a meeting of the review committee members is convened, the committee moderator prints out the list of potential defects entered by each of the committee members, which list of potential defects are arranged in page number order. The moderator therefore has available all the potential defects identified by members of the committee. The recorder of the review committee creates an online record of the disposition of each of the identified potential defects, that is, a potential defect is either accepted or rejected. In addition, during the review meeting new defects may be recorded by the recorder. At the conclusion of the review meeting the accepted defects are exported to the action request database as accepted defect data. Action to correct the accepted defects is tracked using the action request database.

The method of the present invention enables creating and reporting of many metrics including but not limited to total time spent inspecting for potential defects, total meeting time (person-hours), the number of major, minor and redline defects, and the average number of hours spent to identify each of the accepted defects. The action request database also allows reporting many defect metrics. Among the metrics is a particularly useful one of how many peer reviews still have uncorrected defects open along with identification of a specific peer review.

In accordance with the present invention, an integrated electronic process for reviewing a development project to evaluate for potential defects in a product prior to marketing thereof comprises creation of an evaluation review header in a computer database identifying a peer review moderator, author, and task leader. In addition, planning identifies the peer review team members and also identifies the roles of the author and the moderator. Further in accordance with the present invention, the method enables the identification of potential defects within the roles of the author, moderator and the review team members and records the potential defects. A review of the potential defects is made by the author, moderator and review team members to evaluate identified potential defects for acceptance or rejection. The accepted potential defects are removed from the record of potential defects and entered into an action request database as accepted defects. As a follow-up there is confirmation that accepted potential defects have been acted upon and therefore removed from the record of potential defects.

A technical advantage of the present invention is the ability to export defect data generated during the peer review into an action request database. Additional technical advantages include browser-based peer review software and the ability for computer based data entry of potential defects. In addition, a technical feature of the present invention is the ability to enter project-specific data which is useful to compare project by project peer review metrics. Further, the method of the present invention provides entry of severity of defects, as well as types of defects, and in addition provides for recording of metrics associated with peer reviews such as total time spent for a given peer review, average time for peer reviews per project, average number of major, minor and redline defects, and average hours spent finding each type of defect. As a follow-up, a further technical advantage is the ability to track peer reviews to identify uncorrected accepted defects and also the peer reviews having all defects corrected.

BRIEF DESCRIPTION OF THE DRAWINGS

For a more complete understanding of the present invention and the advantages thereof, reference may be made to the accompanying drawings, wherein:

FIGS. 5 through 9 are examples of report types generated in completing an integrated electronic method to evaluate potential defects.

DETAILED DESCRIPTION OF THE DRAWINGS

Figure 1:
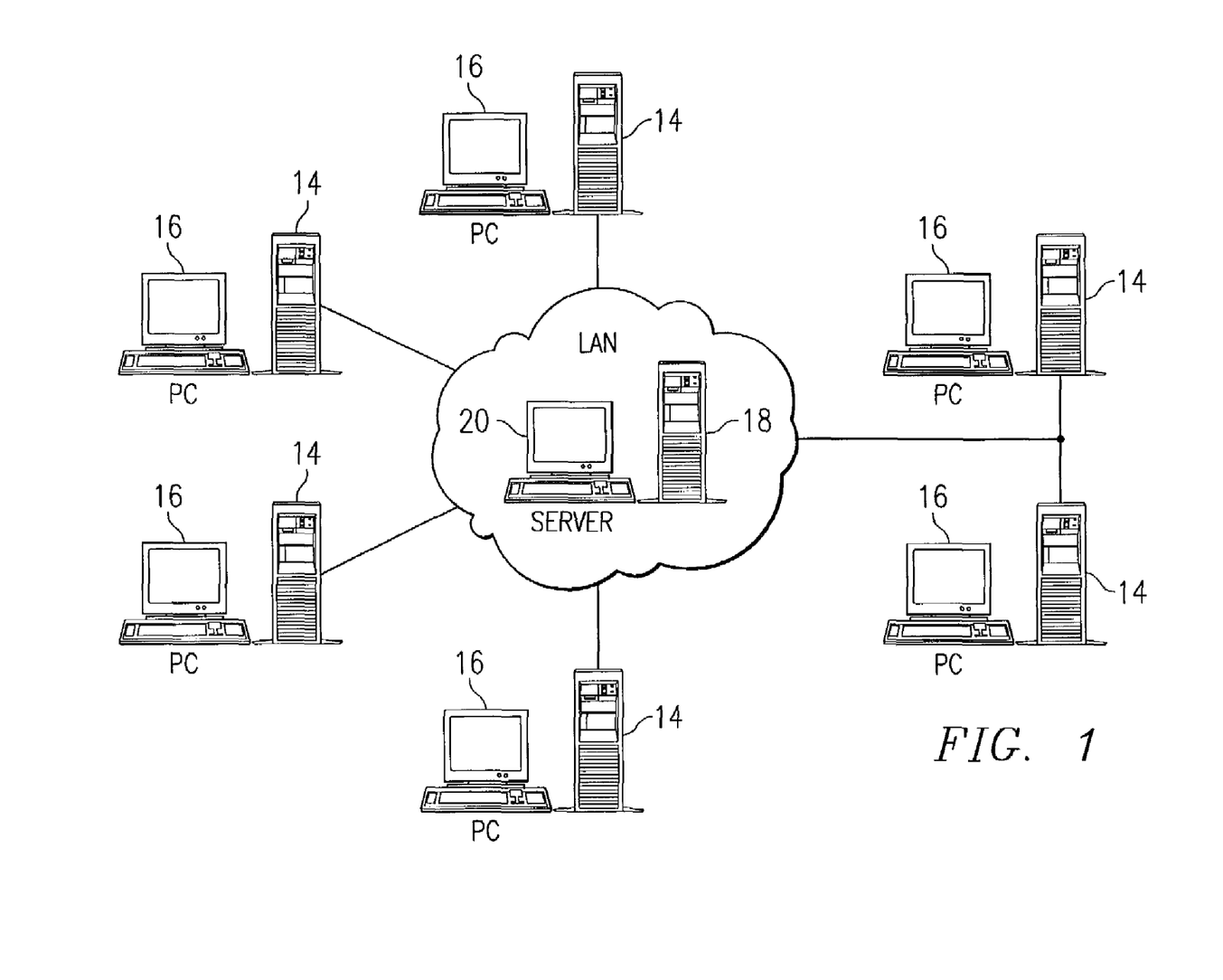
FIG. 1 is an illustration of a typical network computer hardware system for carrying out the method of the present invention.

Referring to FIG. 1, there is illustrated hardware of a typical network for carrying out the method of the present invention for peer evaluation of a product under development. Although the method of the present invention will be described with reference to development of a software product the invention also finds utility in evaluation of the development of computer systems, and computer hardware and other products not specifically related to computers and software.

As illustrated in FIG. 1, the system for performing the method of the present invention includes a server with unlimited number of clients. A local area network of computers 14 with accompanying monitors 16 all run software for peer review evaluation of a product under development. A server 18 hosts the web server and database. Although the system configuration is illustrated with six personal computers 14 each operated by a member of the peer review committee, additional personal computers may be part of this system also for use by members of the peer review committee. However, there is a practical limit to the number of members of the review committee beyond which the effectiveness of the peer review is diminished.

Computer programs for performing the peer review evaluation method of the present invention will be resident only on the server 18. Each of the client PCs must have a web browser installed such as Microsoft's Internet Explorer. The personal computers are interconnected by way of a local area network for the transfer of data and reports between various members of the peer review committee.

Figure 2:
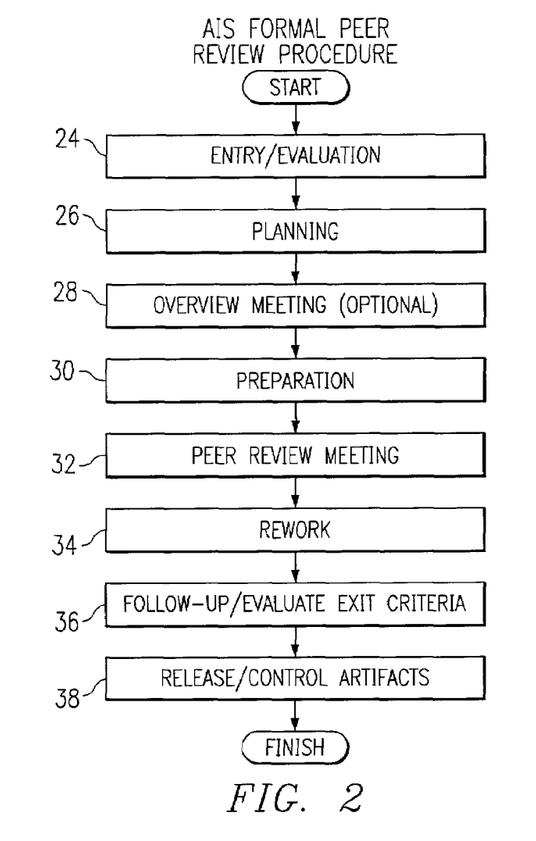
FIG. 2 is a flowchart of a formal peer review of the integrated electronic method for reviewing a development project in accordance with the present invention.

Referring to FIG. 2, there is illustrated a flow diagram of the method for performing a peer review evaluation of a product under development, such as, but not limited to, a software product. The purpose of the peer review is to identify defects in computer programs during the development stage rather than at the end of the development of the program. By systematically evaluating for defects of a computer program during development there is less likelihood of a requirement to make massive revision of the finished program at the end of the development phase. Initially, the method for peer review evaluation of a product starts at an entry/evaluation task 24. During the task 24 a product review evaluation header is created utilizing a capture screen such as generated by Microsoft® Internet Explorer and illustrated in FIG. 4. In creating the peer review evaluation header from the capture screen of FIG. 4 the author of any reports to be generated by the committee and a task leader are identified. The task leader coordinates the effort of the committee members and the responsibility of the author is to prepare the necessary reports for storing in an action request database to be described. In addition, the entry/evaluation task 24 ensures inspection readiness of the product and also selects a moderator.

Upon completion of the entry/evaluation task 24, the method of peer review evaluation advances to a planning task 26. During the planning task 26, team members of the review committee are identified and these members are distributed artifacts for use during the review of a product under development. In addition, the roles of the author and moderator are identified and with the additional information the product review evaluation header created in the entry/evaluation task 24 is completed in the planning task 26. Following completion of the planning task 26 the peer review evaluation advances to an overview meeting task 28. During the overview meeting task 28 the author, moderator and inspectors identified in previous tasks conduct an overview of the artifacts distributed in the planning task 26. Also during the overview meeting task 28 the various members of the product evaluation committee begin the creation of a log to record the amount of time utilized in performing functions of the committee. Next, the method for product review evaluation advances to a preparation task 30 for identification of potential defects in the distributed artifacts. The preparation task 30 is the primary action item for each of the committee members. The committee members operating their own personal computer 14 each create a report of potential defects identified in evaluation of the product. This evaluation is conducted by each of the members of the committee including the author and moderator.

Figure 4:
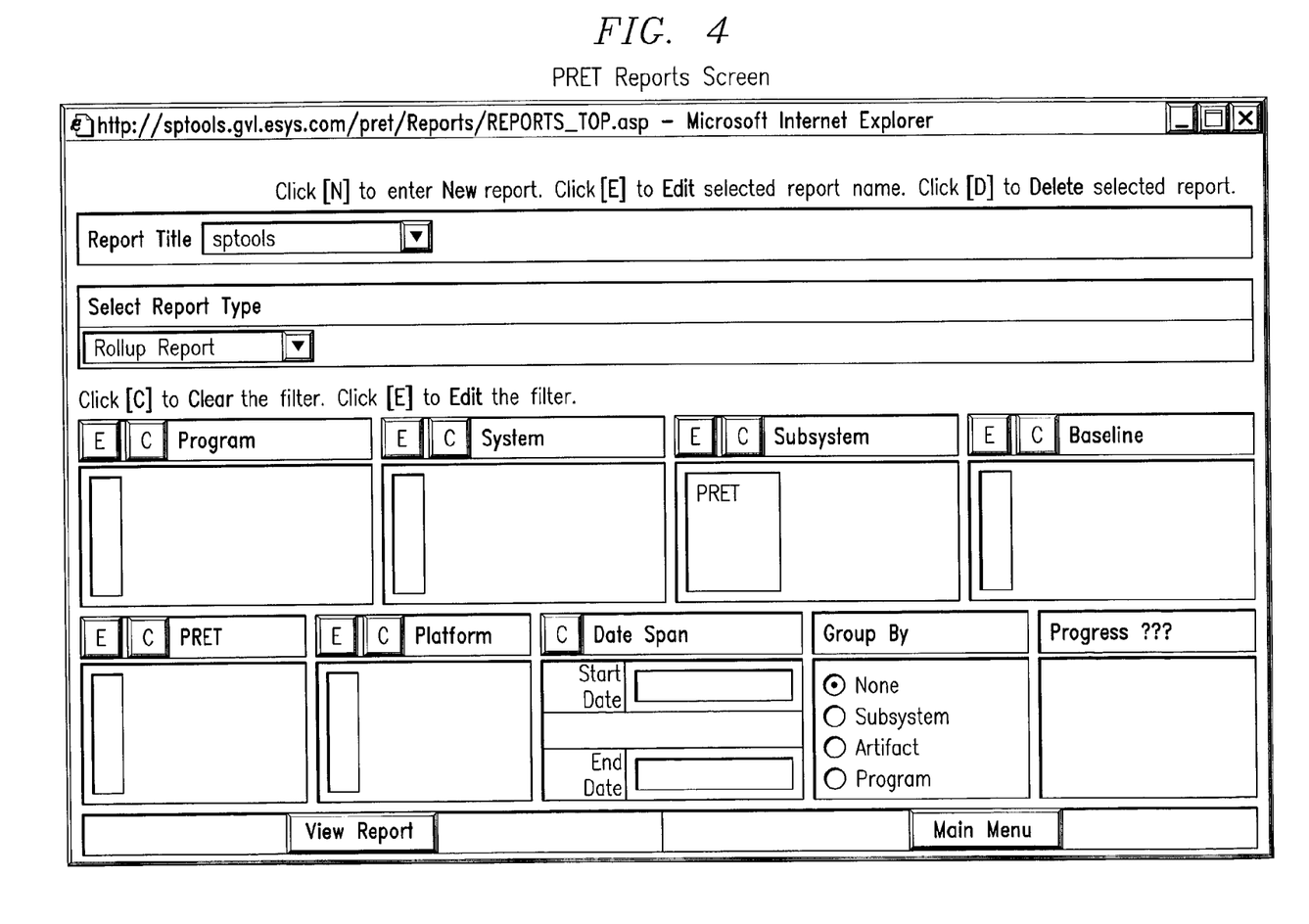
FIG. 4 illustrates a typical report screen for inputting information into an action request database for carrying out a review for potential defects.

Utilizing the capture screen of FIG. 4 each of the committee members records potential defects and this data is transmitted to an action request database and the result is an action review report such as illustrated in FIG. 5. As illustrated in FIG. 5, each member of the review committee utilizing the capture screen of FIG. 4 identifies potential defects recording the location of the potential defect and ranking the potential defect as major or minor. At this time, the defects recorded by members of the committee are all categorized as "potential" defects each to be reviewed by the full committee.

When the product in evaluation is a software product, each member of the committee selects the defect type that best matches the defect condition. When there is a possibility of using more than one defect type for a particular defect, the defect type is chosen based on the following order.

Omission—indicates a required item should have been included but was not.

Examples:

The software requirements specification left out a customer requirement.

The design did not include the functional capability to satisfy a requirement.

Inclusion—indicates an item was included but should not have been. (Note that sometimes programs are designed or use software with functionality not specifically required. For example, the software may include added functionality for reuse or to assist in testing of the software product. These may not be considered defects.)

Examples:

The software requirements specification includes requirements that are not based on the customer's need.

The source code contains more functional capability than is necessary to satisfy the documented requirements.

Compliance—indicates an artifact (e.g., pseudocode) does not meet the standards established by the program. Generally, this defect occurs when the documentation standards or process conventions are not followed.

Examples:

A preamble format differs from the guideline described in the program's software standards and procedures manual.

A test case description uses a non-standard method for documenting expected outputs from the test.

Testability—indicates a functional capability either cannot be tested or violates specific testing guidelines established by the program.

Examples:

To adequately test a requirement, an impossible physical task is implied.

As written, a function may require a high cost testing approach that is contrary to the program's preferred method.

Logic—Indicates a algorithm produces or will produce an incorrect result.

Examples:

During design, the pseudocode specifies a sequence of steps that will result in the incorrect answer.

During coding, syntax errors are discovered that affect the function's performance.

A sequence of functional calls are ordered improperly.

An assumption about data was invalid.

The interface specification between units or software products was incorrect.

Efficiency—indicates the correct results are produced but the approach is inefficient. This most often occurs when the consumption of memory or processing time is critical.

Example:

A function makes redundant calls to a library routine.

A data approach exceeds the memory budget for a program.

Cosmetic—indicates there are minor expression problems such as spelling, grammar, and punctuation.

Example:

A comment contains a misspelling.

Clarity—indicates an expression is ambiguous, poorly worded, or difficult to understand. This occurs where implementation is difficult to understand because of choice in comments, variable names, and/or use of "trick" structural techniques without proper explanation.

Examples:

A variable name and its actual use do not match.

A requirements statement in a software requirements specification is worded so that it makes it unnecessarily difficult to proceed to design.

In addition, each committee member selects the defect reason that best describes why the defect occurred. In combination with the defect type, the defect reason code will help determine the underlying processes that need the greatest improvement. Reason codes are defined below:

Scope—indicates the defect was caused by a customer change after the completion of a particular stage. This reason code is often associated with the omission and inclusion defect types.

Unaware—indicates the defect was caused because the author (e.g., software design engineer) was not aware of pertinent and available information or made an assumption that was not correct. This may mean that additional or improved training is necessary.

Mistake—indicates the defect was caused by an author's mistake. This reason should be used only when the process has been defined and is well-understood by the author.

Misapplied Process—indicates a process step was executed incorrectly. This may point to weakness in training or in scheduling (e.g., not enough time to do all tasks).

Incorrect Process—indicates the defect was caused or allowed because of a process step that was incorrect. For example, the process steps may be out of order or there may be a missing step.

Unclear Process—indicates the defect was caused by process information that was not defined clearly. This reason implies the process is complete but one or more of the steps is ambiguous.

No Process—indicates a defect was caused by ad hoc procedures for a situation not covered by any documented process. If this reason occurs too frequently or if the impact of the defects is significant, there may be sufficient justification to create and follow a standard process.

Reuse—indicates the defect was inherent in an item that was assumed to be defect-free but was not. Undetected errors in common functions or standard templates often are the cause when this reason is used.

The committee member also selects the defect category that best matches the defect condition. When there is a possibility of using more than one defect category for a particular defect, the category is chosen based on the following order:

Not properly handling previous data (initialize, or save for restore)—This means that some type of variable did not get properly initialized, or a value did not get saved off for future use.

Legacy or debug code caused the error—This refers to code that has been there "forever", and due to changes in the code around it, or changes in data values, an error occurs. Also refers to debug code that should have been removed.

Wrong data value or data field used—Refers to incorrect data value (usually a # define or a hard-coded value), or use of an incorrect data field (usually a field within a structure).

Timing issues—Timing issues cannot be found just by looking at the code, they usually show up during integration.

Conversion or calculation error—Self-explanatory.

Functions enabled/disabled (active/gray) incorrectly—Refers to the condition when a certain capability should be available to the user, and it is not. More common with GUIs.

Some action was or was not taken when an event occurs—This refers to functionality that is missing, or to functionality that executes, but at the wrong time.

Incorrect data file or table error—As it implies. An error exists in a file or table, not in the actual code itself.

Interface errors (int, ext)—Internal interface refers to passing data between routines or programs internally. External interface refers to errors in interfaces between processors or devices.

Inadequate range/error checking—As it implies. Additional range or error checking would have avoided the error.

Configuration control error—The wrong version of a module was delivered, software not compiled or linked correctly.

Error introduced while fixing another error—Self-explanatory.

Performance (speed) deficiency—This is not a coding error per se, maybe more of a design error. Can be subjective if requirements did not specify time constraint.

Pointer/indexing error—Typically refers to memory management errors (pointer not deallocated, memory leaks, etc.) or indexing errors (arrays, string lengths, etc.).

Data type/structure/object error—Field incorrectly defined in a structure, wrong data type for data assigned, data overflow (declared int16, should have been int32), etc.

Other—Any error that doesn't fall into any of the above categories.

Following the preparation task 30 the method for peer review evaluation advances to a peer review task 32 that utilizes the action request report of FIG. 5 created by each member of the review committee including the inspectors (members), author and moderator. During the peer review task 32 each of the identified potential defects is considered for each item on the potential defects report as illustrated in FIG. 6. The peer review task 32 may be performed by each of the members of the committee at individual personal computers 14 interconnected by voice and video communication or the peer review task 32 may be performed by all the members of the committee assembled together to review the potential defects report of FIG. 6. During the peer review task 32 each of the potential defects previously identified by the committee members is evaluated and either accepted or rejected with the results recorded in an all meeting defects report as illustrated in FIG. 7. Also during the peer review task 32 the decision is made whether or not a re-inspection of the product documents should occur. All this is recorded in the action request database resident in the personal computer of the master station 16 of FIG. 1. In addition, during the peer review task 32 an all redline defects report is prepared by the author of the committee as illustrated in FIG. 8. Redline defects are one category of defects identified by the peer review process of the present invention.

Figure 9:
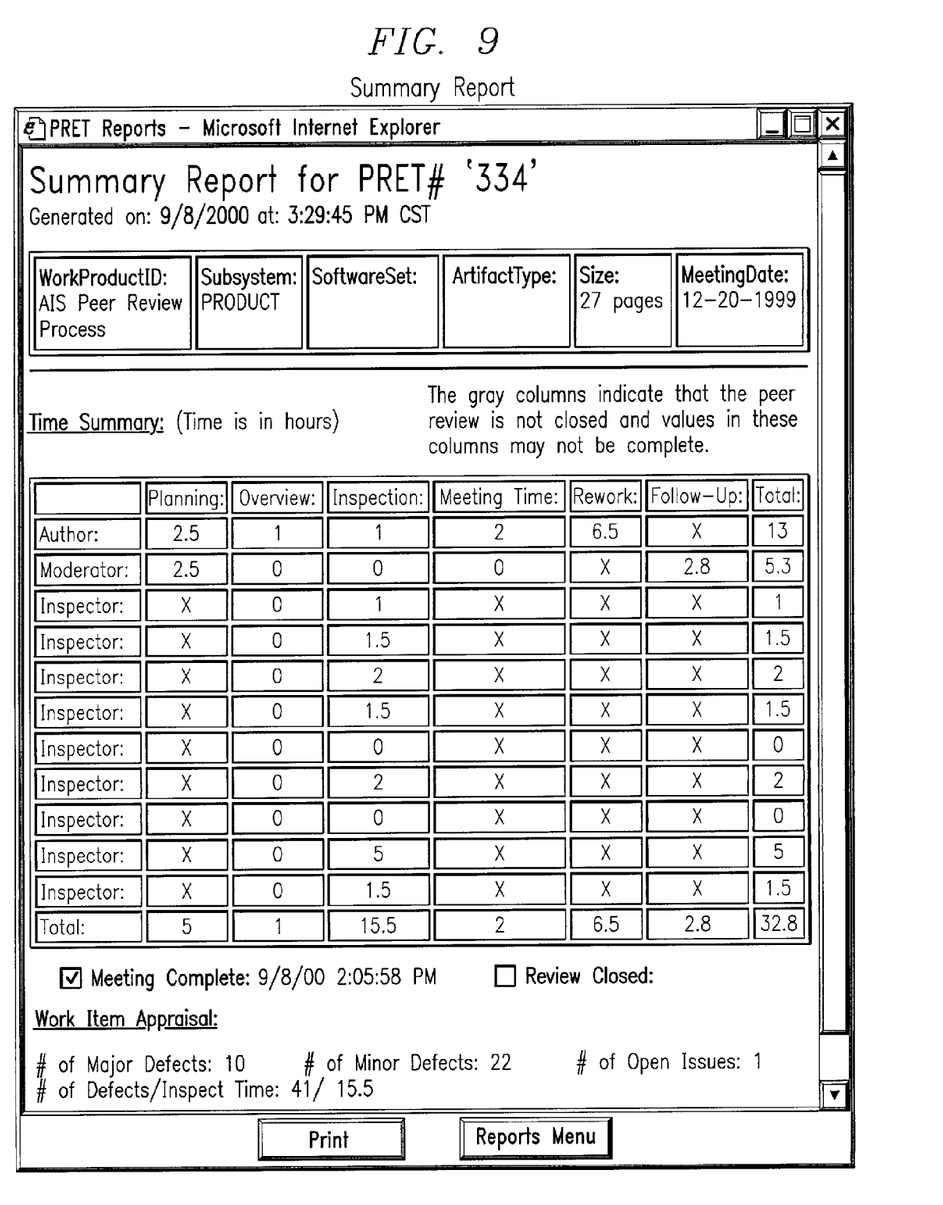

Upon completion of the peer review task 32 the method of peer evaluation advances to a rework task 34. During the rework task 34 all the accepted defects as identified in the report of FIG. 7 are removed from artifacts. This task is performed by the author as identified in the entry/evaluation task 24. All the accepted defects are entered into the action request database to track the rework of the accepted defects until the rework has been completed. Upon completion of the rework task 34 the peer evaluation process advances to a follow up/evaluate exit criteria task 36. During the follow up/evaluation exit criteria task 36 the identified author and moderator prepares a summary report such as illustrated in FIG. 9. Also during the follow up/evaluation exit criteria task 36 rework of the accepted tasks is monitored to ensure removal of the defects.

Following the task 36 the method of the present invention advances to a release/control artifacts task 38 to make the artifact available for production. This task is performed by the author and moderator as previously identified. At this point the peer evaluation review of a product under development is completed and the product released for production and marketing.

Figure 3:
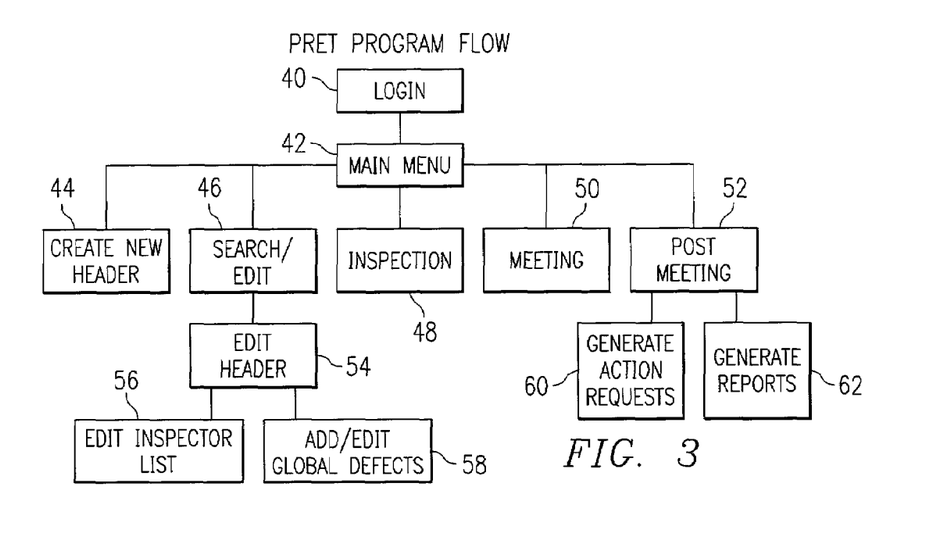
FIG. 3 is a program flow diagram for the integrated electronic method for reviewing a development project to identify and accept defects in a development project.

Referring to FIG. 3, there is shown a flowchart of the peer review evaluation tool (PRET) program run on the personal computers 14 and 18 to perform the method of the present invention for peer evaluation of a product under development. After logging in to the program at login 40 the program displays a main menu to the user on the monitor 16/20 as illustrated in FIG. 1. The main menu is displayed during a computer operation 42. The user selects one of the action items illustrated in FIG. 3 and as explained with reference to FIG. 2. Depending on the action item selected, the program runs one of the sequences as illustrated by routines 44, 46, 48, 50 or 52. Under the search/edit routine 46 the program advances to an exit header subroutine 54 and then to either an edit inspector list subroutine 56 or an add/edit global defects subroutine 58. When running the post meeting routine 52 the program advances to a generated action request subroutine 60 or a generated report subroutine 62. Thus, FIG. 3 illustrates operation of the computer program for carrying out each of the tasks as illustrated and described with reference to FIG. 2.

Figure 10:
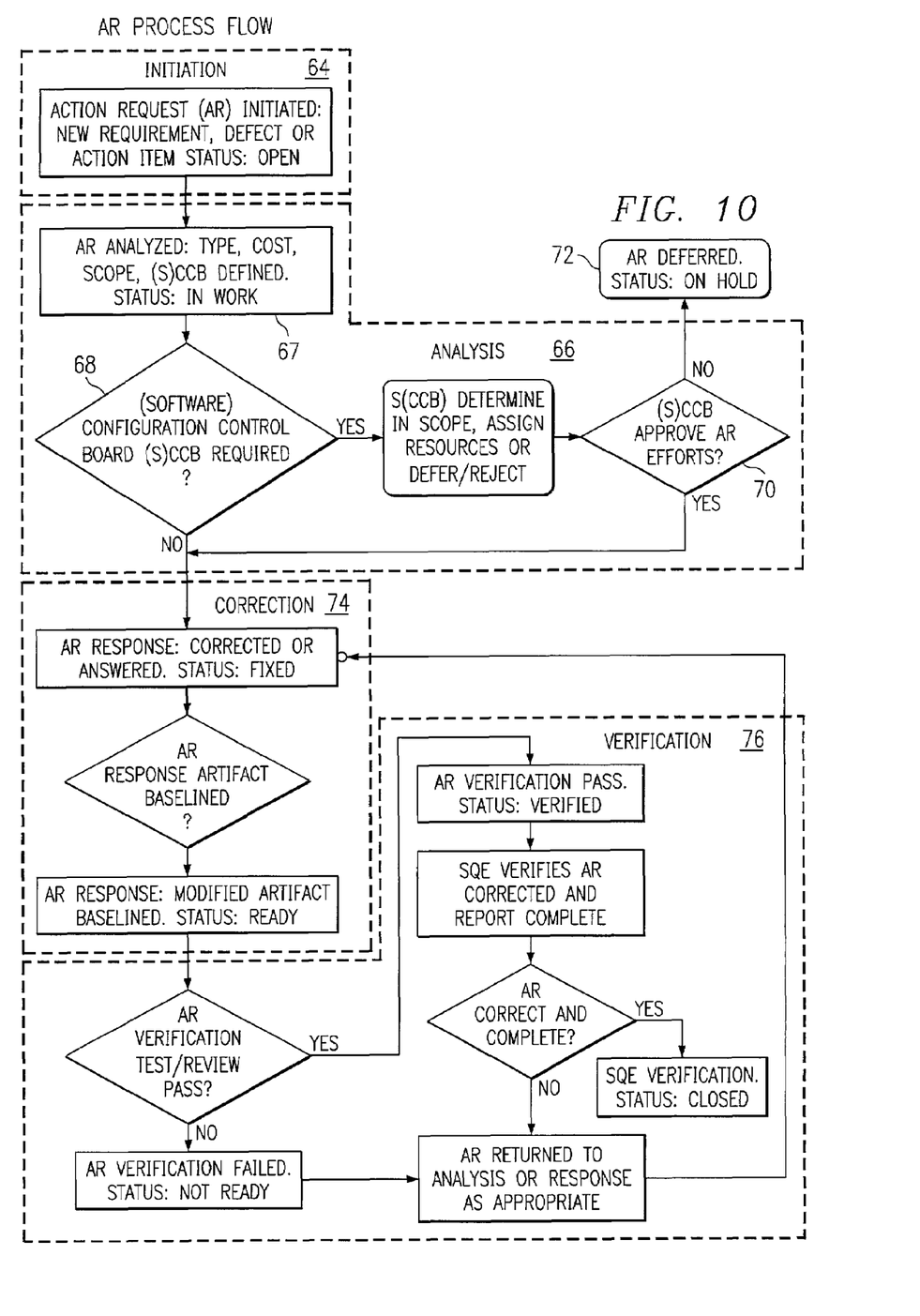
FIG. 10 is a flow chart of an action request database integrated with the evaluation method as illustrated in FIGS. 2 and 3.

Referring to FIG. 10, integrated with the peer review evaluation tool (PRET) program of FIG. 3 is an action request (AR) program for storing action requests in a database. The action request process commences at an initiation 64 to identify a new requirement, a potential or accepted defect or some other action item not necessarily related to peer review evaluation of a product. Following initiation 64 the action review process continues with an analysis 66 that performs an analysis 67 of an action request followed by an inquiry 68 to determine if a software configuration control board (S)CCB is required. The analysis 66 continues to an inquiry 70 to evaluate if the action request effort is to be approved or disapproved. A disapproval of the action request advances the action request flow process to a deferred status 72. When software configuration of the control board is not required and this has been approved, the action request process continues to a correction 74. Following correction 74 the process advances to a verification stage 76. At the conclusion of the verification phase 76 the software quality engineering verification status is closed.

Although the present invention and its advantages have been described in detail, it should be understood that various changes, substitutions, and alterations can be made without departing from the spirit and scope of the present invention as defined by the appended claims.

What is claimed is:

1. An integrated electronic process for reviewing a development project to evaluate for potential defects in a product under development, comprising:
    creating an evaluation review header identifying a peer review moderator, author and task leader;
    creating a peer review team identifying the review team members and the roles of the author and the moderator;
    identifying potential defects within the roles of the author, moderator and the review team members and generating a database record of potential defects;
    providing interconnectivity between the author, moderator, and review team members for the performance of a committee meeting to review of the database record of potential defects, the author, moderator and review team members evaluating identified potential defects for acceptance or rejection during the committee meeting;
    removing the accepted potential defects from the database record of the potential defects;
    entering the accepted potential defects into an action request database; and
    confirming that accepted potential defects have been removed from the record of potential defects by completion of a rework action.

2. An integrated electronic process as in claim 1 wherein identifying potential defects comprises selecting a defect type.

3. The integrated electronic process as in claim 2 wherein selecting a defect type comprises one or more of the following:
    selecting an omission indicating a required item was not included;
    selecting an inclusion indicating the inclusion of an item not required;
    selecting compliance indicating an artifact does not meet established standards;
    selecting testability indicating a function or capability either cannot be tested or violates specific testing guidelines; and
    selecting efficiency indicating production of the correct results.

4. An integrated electronic process as in claim 1 wherein identifying potential defects comprises selecting a defect reason.

5. The integrated electronic process as in claim 4 wherein selecting a defect reason comprises one or more of the following:
    selecting scope indicating a customer change resulted in a defect;
    selecting unaware indicating the lack of awareness of pertinent and available information or making of an incorrect assumption;
    selecting mistake indicating a defect by mistake;
    selecting misapplied process indicating an incorrectly executed process step;
    selecting incorrect process indicating a defect caused by an incorrect process step;
    selecting unclear process indicating a defect caused by not clearly defined information;
    selecting no process indicating a defect caused by ad hoc procedures for a situation not covered by a documented process; and
    selecting reuse indicating an inherent item defect previously assumed to be defect-free.

6. An integrated electronic process as in claim 1 wherein identifying potential defects comprises selecting a defect category.

7. An integrated electronic process as in claim 6 wherein selecting a defect category comprises one or more of the following:
    selecting not properly handling previous data indicating improper initialization of a variable;
    selecting legacy or debug code caused an error;
    selecting wrong data value or data field used indicating an incorrect data value or use of an incorrect data field;
    selecting timing errors;
    selecting conversion or calculation errors;
    selecting functions enabled/disabled incorrectly;
    selecting some action was or was not taken when an event occurred;
    selecting incorrect data file or table error;
    selecting interface errors;
    selecting inadequate range/error checking;
    selecting configuration control error;
    selecting an error introduced while fixing another error;
    selecting performance deficiency; and
    selecting pointer/indexing error.

8. An integrated electronic process for reviewing a development project to evaluate for potential defects in a product under development, comprising:
    identifying potential defects within the roles of an author, moderator and review team members and generating a record of potential defects;
    providing interconnectivity between the author, moderators, and review team members for the performance of a committee meeting to review of the potential defects, by the author, moderator and review team members evaluating identified potential defects for acceptance or rejection during the committee meeting;
    removing the accepted potential defects from the record of the potential defects;
    entering the accepted potential defects into an action request database; and
    tracking the rework of accepted defects until the rework of an accepted defect has been completed.

9. An integrated electronic process as in claim 8 further comprising monitoring the rework of an accepted defect for removal from the action request database.

10. The integrated electronic process as in claim 9 further comprising confirming that accepted potential defects have been removed from the record of potential defects by completion of a rework action.

11. An integrated electronic process as in claim 8 wherein identifying potential defects comprises selecting a defect type.

12. The integrated electronic process as in claim 11 wherein selecting a defect type comprises one or more of the following:
    selecting an omission indicating a required item was not included;
    selecting an inclusion indicating the inclusion of an item not required;
    selecting compliance indicating an artifact does not meet established standards;

selecting testability indicating a function or capability either cannot be tested or violates specific testing guidelines; and selecting efficiency indicating production of the correct results.

13. An integrated electronic process as in claim 8 wherein identifying potential defects comprises selecting a defect reason.

14. The integrated electronic process as in claim 13 wherein selecting a defect reason comprises one or more of the following:

selecting scope indicating a customer change resulted in a defect;

selecting unaware indicating the lack of awareness of pertinent and available information or making of an incorrect assumption;

selecting mistake indicating a defect by mistake;

selecting misapplied process indicating an incorrectly executed process step;

selecting incorrect process indicating a defect caused by an incorrect process step;

selecting unclear process indicating a defect caused by not clearly defined information;

selecting no process indicating a defect caused by ad hoc procedures for a situation not covered by a documented process; and selecting reuse indicating an inherent item defect previously assumed to be defect-free.

15. An integrated electronic process as in claim 8 wherein identifying potential defects comprises selecting a defect category.

16. An integrated electronic process as in claim 15 wherein selecting a defect category comprises one or more of the following:

selecting not properly handling previous data indicating improper initialization of a variable;

selecting legacy or debug code caused an error;

selecting wrong data value or data field used indicating an incorrect data value or use of an incorrect data field;

selecting timing errors;

selecting conversion or calculation errors;

selecting functions enabled/disabled incorrectly;

selecting some action was or was not taken when an event occurred;

selecting incorrect data file or table error;

selecting interface errors;

selecting inadequate range/error checking;

selecting configuration control error;

selecting an error introduced while fixing another error;

selecting performance deficiency; and selecting pointer/indexing error.

17. A distributed peer review system for reviewing a development project to evaluate for potential defects in a product under development, comprising:

a plurality of personal computers interconnected as a network, wherein at least one of the personal computers comprises a program to:

provide interconnectivity between the author, moderator, and review team members for the performance of a committee meeting;

generate a report identifying potential defects within the rules of an author, moderator and review team members;

generate, in response to the committee meeting, a defects report from a committee review of the potential defects by the author, moderator and review team members, the report identifying potential defects for acceptance or rejection;

generate an action request database for accepted potential defects; and generate a summary report tracking the rework of accepted defects until the rework of an accepted defect has been completed.

18. The distributed peer review system as in claim 17 wherein the program further comprises creating a database of accepted potential defects removed from the record of potential defects.

19. The distributed peer review system as in claim 17 wherein the plurality of personal computers comprises a first local area network and a second remote local area network.

20. A distributed peer review system as in claim 17 wherein identifying potential defects comprises selecting a defect type.

21. A distributed peer review system as in claim 20 wherein identifying potential defects comprises selecting a defect reason.

22. The distributed peer review system as in claim 21 wherein identifying potential defects comprises selecting a defect category.

* * * * *